United States Patent [19]

Marossy et al.

[11] 4,393,859
[45] Jul. 19, 1983

[54] SOLAR COLLECTOR ROOF

[75] Inventors: Gabor Marossy; Warren E. Mueller, both of Middletown, Ohio

[73] Assignee: Armco Inc., Middletown, Ohio

[21] Appl. No.: 122,583

[22] Filed: Feb. 19, 1980

[51] Int. Cl.³ .............................................. F24J 3/02
[52] U.S. Cl. .................................. 126/429; 126/431;
126/444; 126/450; 126/452; 52/588; 47/17
[58] Field of Search ............... 126/428, 429, 431, 444,
126/450; 47/17; 52/538, 588, 409, 412, 339,
538, 588, 409, 412

[56] References Cited

U.S. PATENT DOCUMENTS

| | | | |
|---|---|---|---|
| 246,626 | 9/1881 | Morse | 126/429 |
| 1,742,861 | 1/1930 | Johnson | 126/428 |
| 2,039,293 | 5/1936 | Calkins et al. | 52/588 X |
| 2,062,160 | 11/1936 | Calkins et al. | 52/588 X |
| 2,090,483 | 8/1937 | Mendez | 52/336 X |
| 2,889,763 | 6/1959 | Pine | 98/31 |
| 3,296,761 | 1/1967 | Varlonga | 52/409 X |
| 3,531,899 | 10/1970 | Bartlett | 47/17 |
| 3,791,076 | 2/1974 | Gahler | 47/17 |
| 3,994,278 | 11/1976 | Pittinger | 126/422 |
| 4,020,989 | 5/1977 | Kautz | 126/427 |
| 4,029,080 | 6/1977 | Warren | 126/428 X |
| 4,029,258 | 6/1977 | Groth | 126/429 |
| 4,051,833 | 10/1977 | Vandament | 126/400 |
| 4,076,013 | 2/1978 | Bette | 126/430 |
| 4,098,260 | 7/1978 | Goettl | 126/428 |
| 4,114,595 | 9/1978 | Barker | 126/450 X |
| 4,114,597 | 9/1978 | Erb | 126/448 |
| 4,120,287 | 10/1978 | Marles et al. | 126/450 |
| 4,136,669 | 1/1979 | Lane | 126/450 |
| 4,144,680 | 3/1979 | Kelly | 126/428 X |
| 4,174,703 | 11/1979 | Blakey et al. | 126/430 |
| 4,175,542 | 11/1979 | Duchene | 126/449 |
| 4,184,476 | 1/1980 | McArthur | 126/429 |
| 4,228,787 | 10/1980 | Steinemann | 126/433 |
| 4,233,958 | 11/1980 | Heden | 47/17 |

Primary Examiner—Larry Jones
Attorney, Agent, or Firm—Frost & Jacobs

[57] ABSTRACT

A solar roof for providing air heated by solar energy to the interior of a prefabricated building of the type having a relatively low pitched roof structure formed by a plurality of interlocking ribbed roof panels. A solar radiation transmissive glazing is attached between the roof panel ribs or other support members to form air passageways. A duct-like inlet plenum communicates with the inlet of each passageway for selectively directing air from inside or outside of the building passageways. A duct-like exhaust plenum communicates with the outlet of each passageway for directing heated air to the building interior. The roof surface may be provided with a darkened coating to increase the absorptivity of the surface and increase the collecting efficiency. The glazing material may be thin flexible solar radiation transmissive sheets or relatively rigid panels of solar radiation transmissive material. The solar roof may be retrofitted to an existing roof structure to provide supplemental solar heating capability.

35 Claims, 23 Drawing Figures

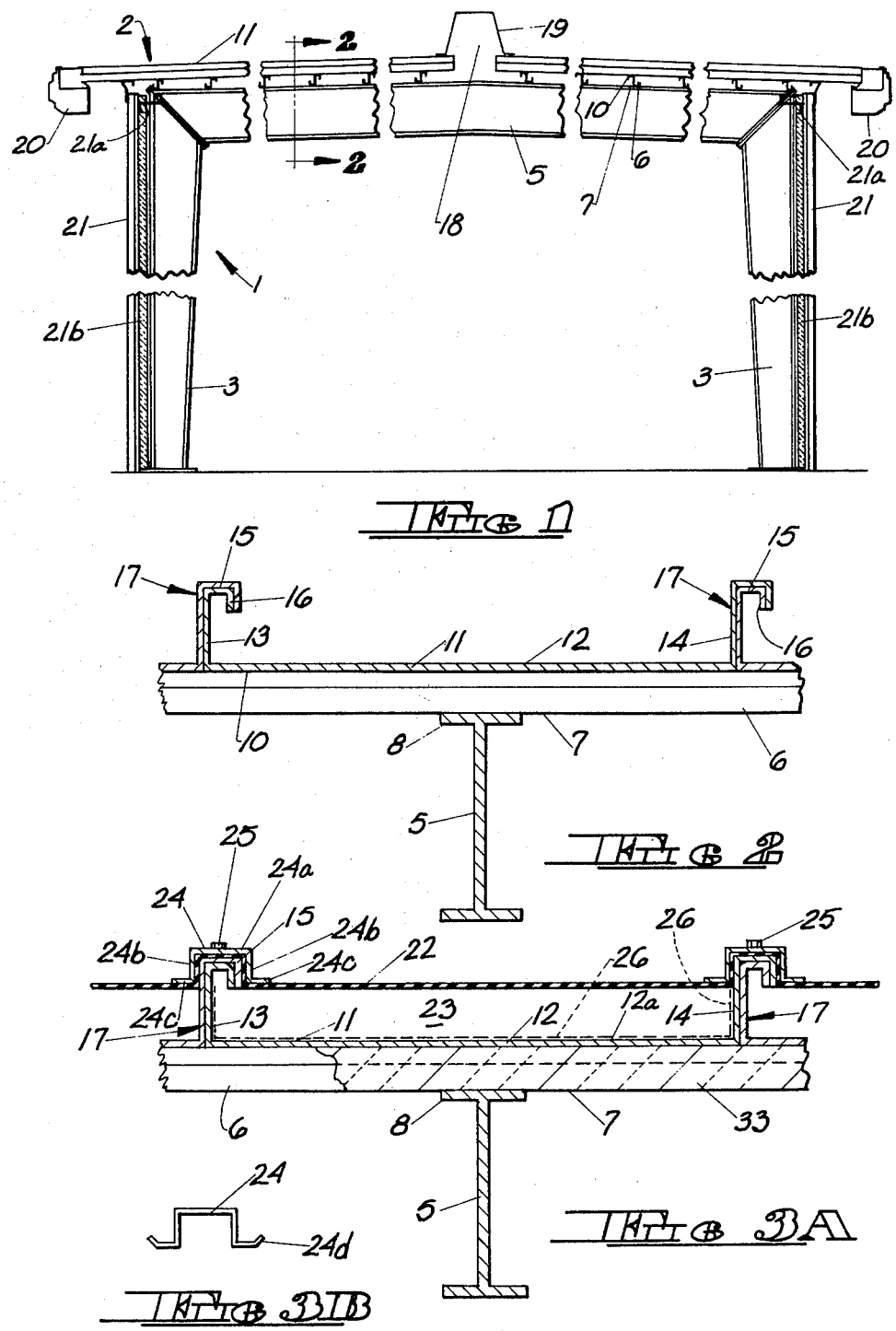

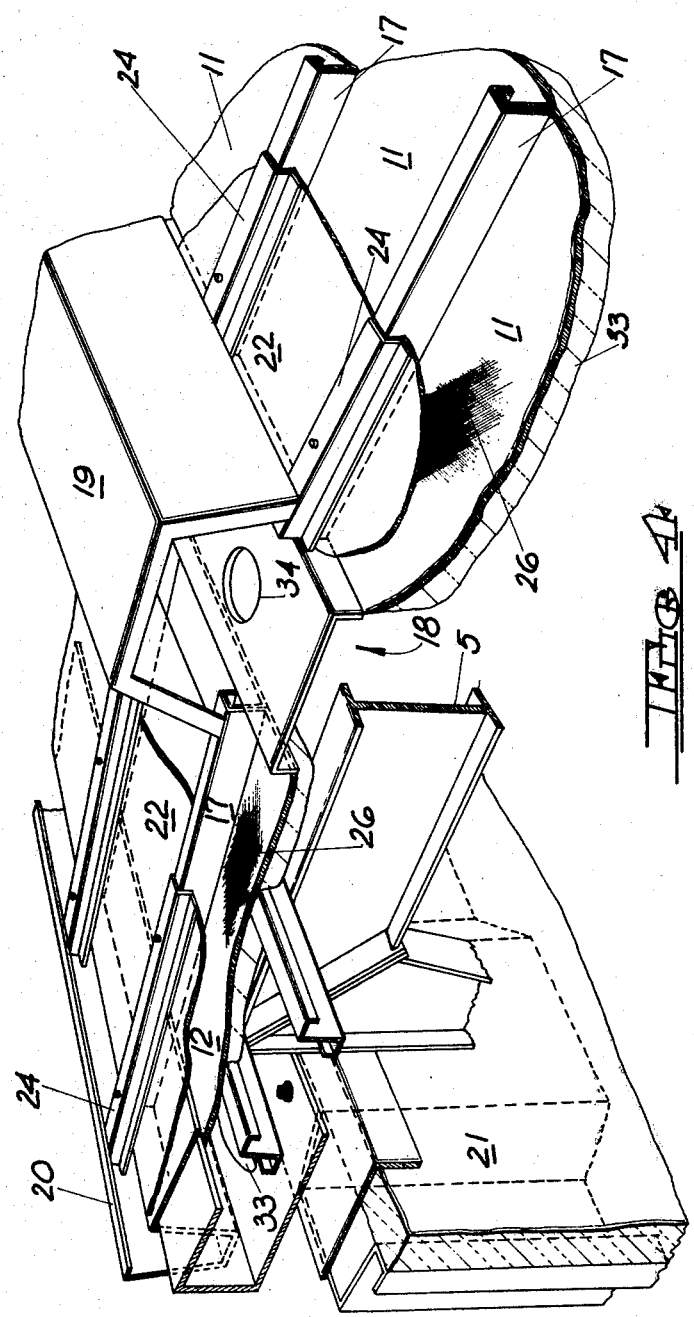

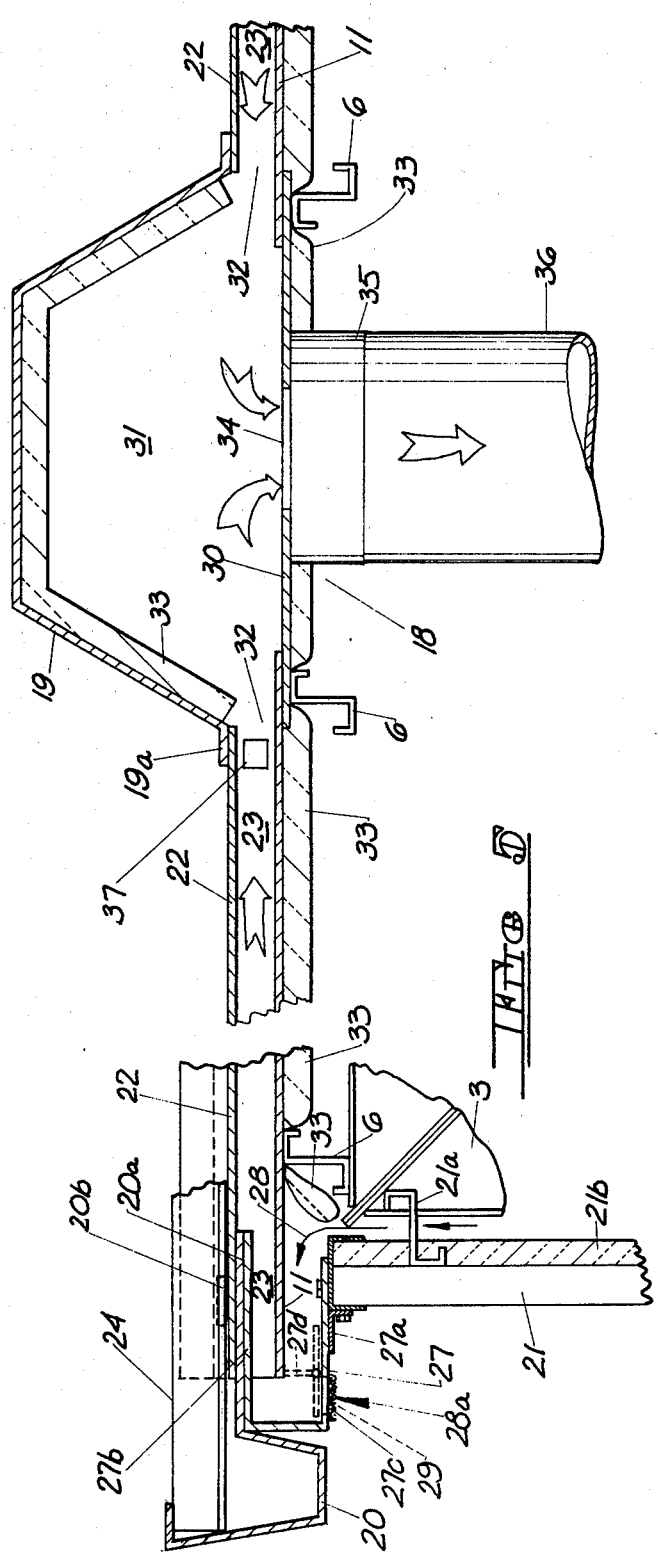

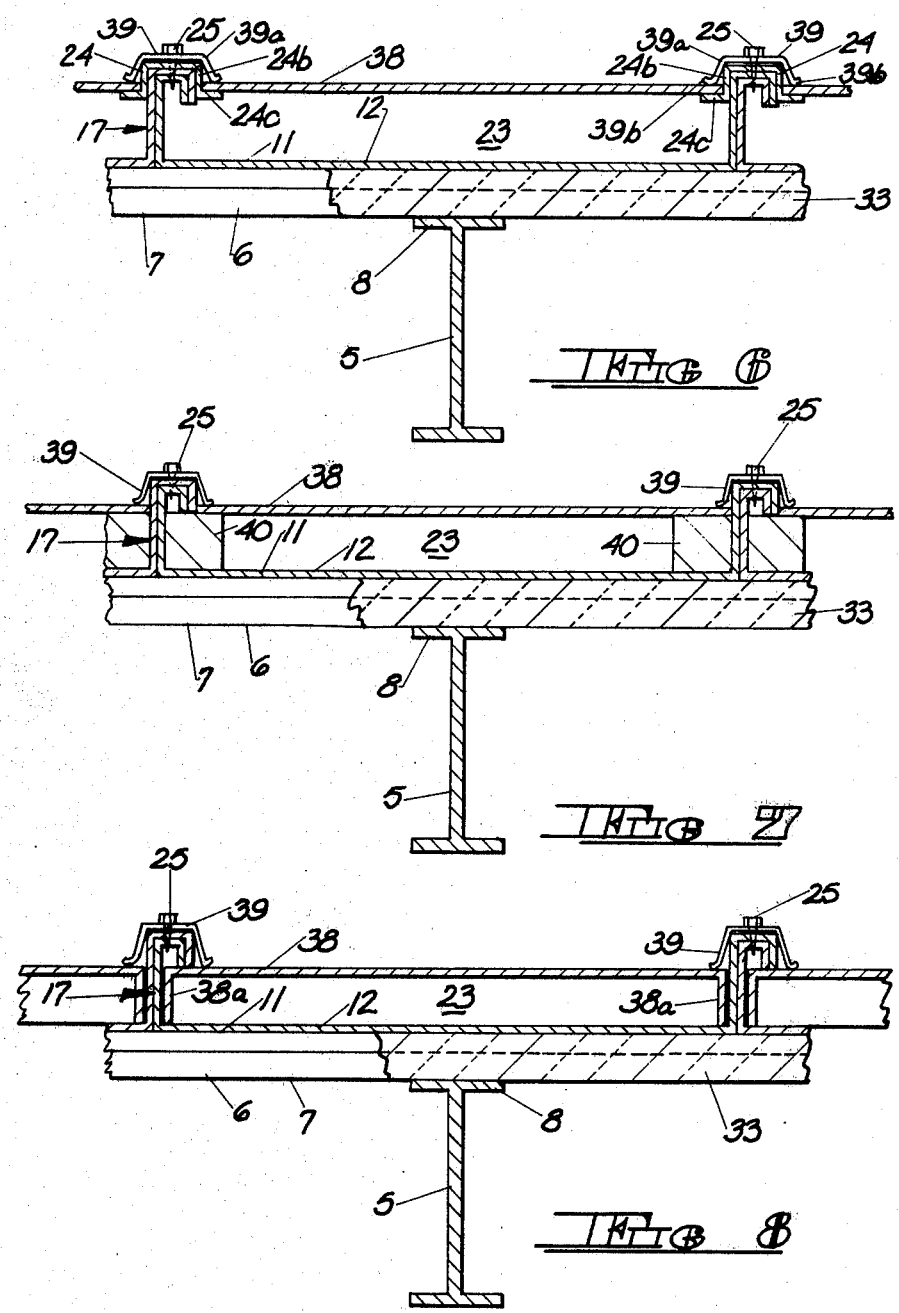

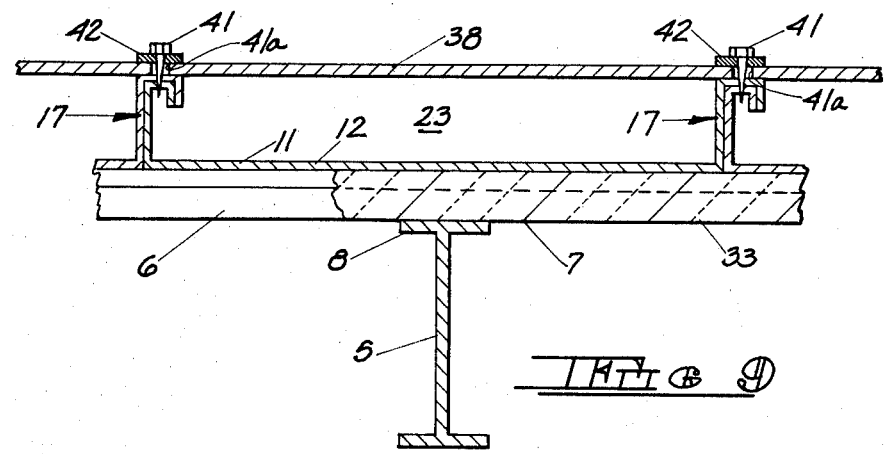
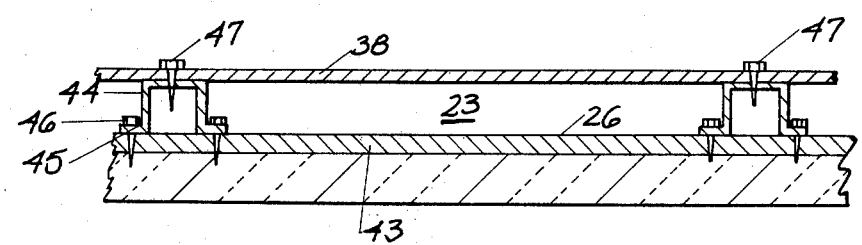
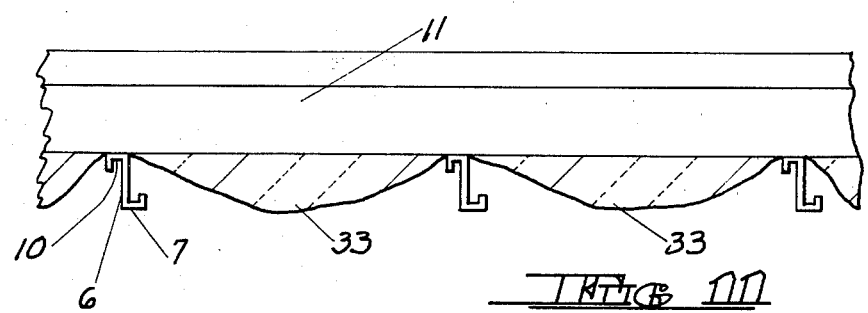
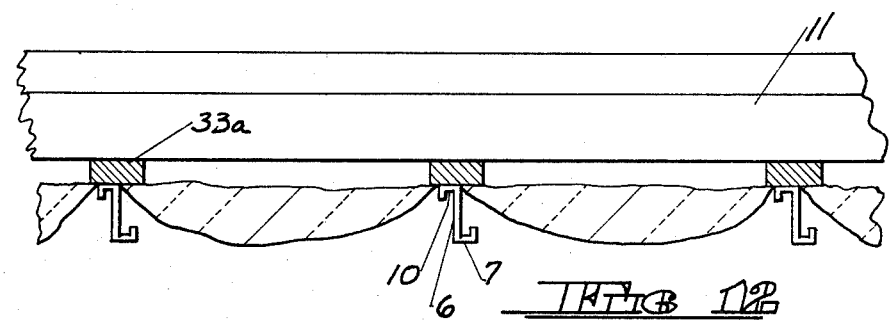

SOLAR COLLECTOR ROOF

SUMMARY OF THE INVENTION

The critical shortage of non-renewable energy resources has accelerated the search for viable alternative energy sources which do not rely on scarce natural supplies such as fossil fuels, radioactive materials, etc. It appears that most of the research in this field has concentrated in the area of solar energy, particularly for meeting the space and water heating requirements of residential and nonresidential buildings.

Fundamentally, research in solar collection techniques has concentrated in three primary areas: passive collection, liquid distribution and air distribution. In general, passive collection techniques take advantage of solar heat without mechanical heat transmission facilities as such. For example, in direct gain passive solar heating systems, the solar heat enters the building interior through windows or window-like collectors, with heat being transmitted to the surroundings which store the heat. In indirect gain passive solar heating systems, solar energy is collected by a heat storage unit such as a body of water or concrete wall or slab, from which it is released to the building interior as needed. Finally, isolated gain passive solar heating systems involve storage-collector components which are separated from the building interior and transmit their stored heat, as needed, through radiation or convection. Unfortunately, such systems often rely heavily on particular building orientations to insure south-facing walls or windows, as well as natural terrain features or massive structural heat storage components, which make them undesirable for existing structures, particularly in areas of fixed building aesthetics or proximity to other structures.

The most common solar heat collector for use with liquid systems is a box-like enclosure containing a flat sheet of metal to which metal tubes are mechanically fastened. The metallic sheet and the tubes are covered with a darkened coating so that when the rays of the sun strike the unit, the metal absorbs the heat which is transferred to the liquid flowing through the tubes. A pump may be used to circulate the collector liquid through a heat exchanger which transfers the heat to the building interior or a storage area as needed. Although this type of solar collector has distinct advantages such as high exit fluid temperatures and collection efficiency, there are also several disadvantages such as corrosion of the liquid carrying conduits, or danger of leakage, freezing or evaporation of the liquid, etc. Furthermore, such collection systems often use significant quantities of metal components with good heat conduction characteristics, such as copper, which not only increase the cost of the units, but also their weight, making the collection unit unsuitable for existing structures having limited roof loading capability. Furthermore, the fact that individual collection panels must be placed on the building roof at the proper angle and orientation for maximum efficiency, and must be interconnected with a source of heat transfer fluid as well as additional heat transfer apparatus, severely reduces the cost effectiveness of liquid-type distribution systems, particularly for existing structures.

Active air systems operate in much the same manner as conventional forced-air heating systems. Generally, active air solar collectors comprise a box-like enclosure containing an absorber which absorbs the solar radiation and converts it to heat energy. The upper surface of the collector is generally formed of a material transparent to solar radiation so that the maximum amount of solar energy may be transferred to the blackened surface of the absorber. Air directed through the enclosure is warmed by contact with the absorber, and may be directed to other parts of the structure for space or water heating purposes. As in the active liquid systems, solar collectors using air as the heat transfer medium must be individually constructed and placed at the proper orientation on the structure roof. Consequently, this type of arrangement is unsuitable for existing structures with roofs having limited loading capability. Furthermore, the initial cost of construction of the solar collector units may be prohibitive, particularly where large numbers of such collectors are necessary to heat a relatively large enclosed area.

As a result of the aforementioned drawbacks, particularly the cost effective factors, solar heating has not proved to be a presently viable alternative to conventional heating sources, particularly for existing structures. Nonetheless, as the availability of conventional energy resources diminishes, the need to supplement conventional heating plants with naturally available energy sources such as solar energy becomes increasingly important.

The present invention is directed to means for adding supplemental solar energy heating capability to existing and new building structures, particularly those of the pre-engineered metal building variety. These structures, such as the Armco building systems manufactured by Armco, Inc. Metal Products Division, Middletown, Ohio, include interior structural steel framing supporting exterior metallic wall panels and metallic roof panels interfitted to form a continuous roof covering. Such buildings are relatively inexpensive to construct and maintain, and are suitable for applications such as indoor recreational, commercial, or manufacturing facilities and the like requiring large interior areas.

In a typical structural installation, such as a warehouse, manufacturing plant or other commercial facility, a plurality of spaced roof purlins are supported horizontally by transversely extending rafters. A plurality of rigid interlocking rectangular metallic roof panels extend transversely of and are supported by the purlins. Often such roofs are provided with a relatively low pitch, terminating at a ridge or peak in a duct-like hollow ridge vent. Some constructions may also use butterfly, flat or single slope roofs.

Each rectangular metallic roof panel includes a central planar portion and web portions extending upwardly along opposite longitudinal edges of the planar portion, with the upper edges of the webs terminating in downwardly directed channel-like flanges, such that adjacent webs of adjoining panels may be interlocked in a channel-shaped rib configuration to form a substantially continuous roof surface. As is well understood in the art, this type of roof construction forms a plurality of parallel spaced channel-shaped ribs extending between the peak and the eaves of the roof, with the area between the ribs forming a concave trough or channel. Generally, such a roof has a relatively small pitch, on the order of 1:12 or less, and is designed to withstand its own dead load plus live and uplift loads.

The present invention uses a major part of the roof surface of such pre-engineered metal buildings to heat air for space heating or water heating purposes in the building interior, and avoids the use of separate solar collecting units as in previous designs. In particular, glazing means in the form of flexible or rigid solar radiation transmissive sheets or panels extend between the upstanding roof ribs in spaced parallel relationship with the roofing panel trough or channel to form a plurality of parallel duct-like air passageways extending between the roof eave and peak, in the case of sloped roofs. The upper surface of each roof panel trough is provided with a black coating to increase the absorptivity of the roof surface, thereby transforming each roof panel into a heat exchanger for converting incident solar radiation to thermal radiation to heat air moving through the air passageway. In a preferred embodiment, a movable multiple position damper-like valve controls the flow of air through an inlet plenum to the duct-like air passageway. With the valve in a first position, air from within the building structure is recirculated through the air passageways, directed upwardly over the upper surface of the roof panel, and exhausted into a duct-like hollow ridge vent at the peak of the roof which acts as a collector header. The air warmed in this manner may then be drawn from the ridge vent by a blower or other air moving means into the building interior for space heating or water heating purposes as is well known in the art. With the valve in a second operative position, air from outside the building structure is drawn into the air passageways through louvered openings in the roof soffit, and directed to the building interior as described above. With the valve in positions other than those described, a selectable mixture of air from both inside and outside the building structure may be drawn through the air passageways.

It will be observed that this arrangement easily permits existing or new structures to utilize supplemental solar heating without the drawbacks found in conventional solar collectors as discussed hereinabove. Furthermore, the exterior appearance of the structure roof is not changed to any great extent, thereby preserving the external aesthetics of the building. Although the efficiency of an individual roofing panel considered as a solar collector may be less than conventional solar collectors, the total cost effectiveness of the present invention is comparable since the entire roof surface may be utilized at considerably less total cost. Consequently, the present invention permits conversion or retrofitting of existing building structures, particularly of the pre-engineered type, to include supplemental solar heating capabilities.

Additional features of the invention will become apparent from the detailed description which follows.

BRIEF DESCRIPTION OF THE DRAWING

FIG. 1 is a fragmentary end elevation view of a typical pre-engineered building structure.

FIG. 3A is a fragmentary cross sectional view illustrating a first embodiment of the support means of the solar collector roof structure of the present invention.

FIGS. 3B and 3C are enlarged cross sectional views of alternate hat section arrangements.

FIG. 4 is a fragmentary perspective view, partially in cross section, illustrating the installation of the solar collector roof structure of FIG. 3A.

FIG. 5 is a fragmentary cross sectional view of the solar roof structure of FIG. 4 with valve member 27d illustrated diagramatically.

FIG. 6 is a fragmentary cross sectional view of another embodiment of the solar collector roof of the present invention using rigid glazing sheets and hat section support means.

FIG. 7 is a fragmentary cross sectional view of another embodiment of the solar collector roof of the present invention using rigid glazing sheets and support blocks.

FIG. 8 is a fragmentary cross sectional view of another embodiment of the solar collector roof of the present invention using rigid glazing sheets including supporting legs.

FIG. 9 is a fragmentary cross sectional view of another embodiment of the solar collector roof of the present invention using rigid glazing sheets extending between roof panel ribs.

FIG. 10 is a fragmentary cross sectional view of another embodiment of the solar collector roof of the present invention using rigid glazing sheets installed on a smooth surfaced building roof.

FIG. 11 is a fragmentary enlarged view of the roof support structure of FIG. 1.

FIG. 12 is a fragmentary enlarged view of the roof support structure of FIG. 1 illustrating an alternative insulation arrangement.

FIG. 20 and FIG. 21 illustrate embodiments of the invention using insulated glazing support members.

DETAILED DESCRIPTION

FIG. 1 illustrates a typical pre-engineered building structure, shown generally at 1, such as that manufactured by Armco, Inc., Metal Products Division, Middletown, Ohio, having a conventional gabled roof structure 2, often referred to as a Steelox ® roof system. The interior building support structure is formed by vertical steel columns 3 bearing horizontal steel rafter 5, to form an inverted U-shaped girder frame work. It will be understood that a plurality of such support structures may be provided at spaced intervals along the length of building 1 as required.

Figure 2D:
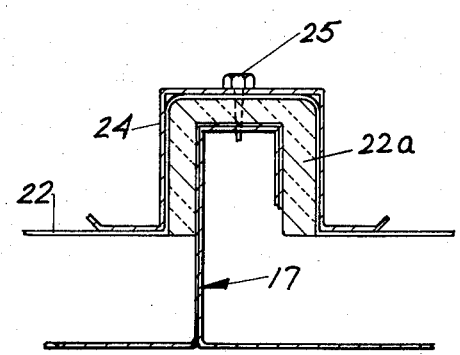
FIG. 2 is a fragmentary enlarged cross sectional view taken along section line 2—2 of FIG. 1.
Figure 2E:
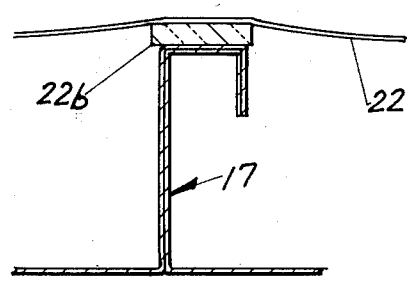

A plurality of elongated Z-shaped purlins, one of which is shown at 6, are positioned at spaced intervals along the upper surface of rafter 5, with the lowermost horizontal flange portion 7 resting on the upper flange surface 8 of rafter 5, as is best shown in FIG. 2. The upper horizontal flange portion 10 of Z purlin 6 supports the lower surfaces of a plurality of plate-like rigid interlocking rectangular metallic roof panels, one of which is shown at 11, which extend transversely of and are supported by purlins 6. Each roof panel 11 includes a central planar portion 12, a male web portion 13 extending upwardly along one longitudinal edge portion 12, and a female web portion 14 extending upwardly along the opposite edge portion 12. As is best shown in FIG. 2, male web 13 is slightly shorter than female web 14. The upper edges of each web terminate in a horizontal flange portion 15 and a downwardly directed lip 16 to form a downwardly directed channel-like flange. The channel-like flange of male web 13 is dimensioned and configured to fit within the downwardly directed channel-like flange of female web 14 to interlock adjacent roof panels tightly together, thereby resulting in a channel-shaped rib, shown generally at 17, in order to form a substantially continuous roof surface.

As is best shown in FIG. 1, the upper surface of rafter 5 slopes upwardly from its outer ends to approximately the center of the rafter, in order to impart a slight pitch, on the order of 1:36, to form gabled roof structure 2. A longitudinally extending opening 18 may be provided at the peak or ridge of roof structure 2, and covered with an elongated ridge cap or duct-like hollow ridge vent 19. The outermost edges of roof structure 2 may be provided with gutters 20, and suitable vertical metallic building walls 21 supported by eave girt 21a, may also be provided, as desired, to produce a pleasing exterior appearance. Thermal insulation 21b may be secured to the inner surface of wall 21 to limit heat loss from the building.

Figure 3C:
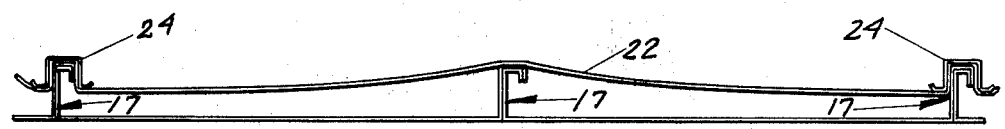

In a first embodiment of the present invention as illustrated in FIGS. 3A, 3C and FIG. 4, glazing means consisting of a thin flexible sheet of solar radiation transmissive material such as Tedlar PVF film is attached between roof panel ribs 17 in spaced relationship with planar portion 12 to form a duct-like air passageway 23 between the upper surface 12a of planar portion 12 and the lower surface of glazing means 22. In a preferred embodiment, glazing means 22 is secured to some or all of ribs 17 by means of an elongated hat-shaped section 24 attached to rib 17 by means of threaded fastener 25 or the like so as to securely clamp glazing means 22 between the upper surface of female flange section 15 and the lower surface of horizontal portion 24a of hat section 24. Hat section 24 also includes a pair of legs 24b extending downwardly from the outer edges of portion 24a, and terminating in outwardly directed flange portions 24c. The lower surfaces of hat section flange portions 24c bear against the upper surface of glazing means 22, thereby spacing the glazing means from planar portion 12 of roof panel 11 to form air passageway 23 as well as insuring that glazing means 22 is tightly stretched between ribs 17 to avoid sags and ripples that might reduce collection efficiency. It may be desirable to provide upturned ends 24d to flanges 24c (see FIG. 3A) to insure against tearing of thinner gauge films during construction.

Alternatively, as shown in FIG. 3C, glazing means 22 may be secured to non-adjacent ribs 17, such as every other rib, every third rib, etc., depending on the type and size of glazing material used. Intermediate ribs are used only to support the lower surface of the glazing to prevent sagging.

The upper surface of the trough or channel formed within roof panels 11 by webs 13, 14 and planar surface 12 may be treated with a solar radiation absorbing coating to increase the absorptivity of the surfaces and consequently increase the collection efficiency of the solar roof. In this regard, it has been found that coating the innermost surfaces of webs 13 and 14, and the upper surface of planar portion 12 with flat black paint, as at 26, provides an inexpensive and effective means for increasing the absorptivity of the solar collector roof. Furthermore, coating the inner web portions 13 and 14 of ribs 17 provides additional collection area and reduces reflection of incident radiation from within the trough or channel. It will be understood that other types of coatings may be substituted as required in particular applications.

As best shown in FIG. 4 and FIG. 5, the downwardly extending lip 27a of a modified eave flashing comprising a C-shaped box-like inlet plenum 27 is fastened to the upper edge of vertical building wall 21 such that the plenum 27 extends outwardly along the eave of the building. The upper horizontal web 27b of the inlet plenum extends into air passageway 23 adjacent the lower surface of glazing 22. The lowermost end of glazing may be held in place overlying the outwardly extending flange 20a of gutter 20 by means of flashing strip 20b as required. It will be observed that this arrangement permits air from within the building structure to pass through inlet plenum 27 to the inlet ends of the air passageways 23 as shown by directional arrow 28, where it is heated as described above.

The lower horizontal surface of plenum 27 may also be provided with a lowered opening 27c to permit air from outside of the building structure to be drawn into plenum 27 as shown by directional arrow 28a. Opening 27c may be covered by a protective screen or mesh to prevent infiltration of foreign objects, animals, etc.

A movable damper-like valve member 27d is rotatably positioned within inlet plenum 27 to control the source of air supplied to air passageways 23. With valve member 27d in a first position, illustrated diagramatically in FIG. 5, wherein the valve is horizontally disposed to cover or block opening 27c, air will be supplied exclusively from within the building interior. With the valve in a second substantially vertical orientation and blocking the portion of plenum 27 leading to the building interior, air will be supplied exclusively to passageways 23 through opening 27c from the building exterior. With valve member 27d in any other position, a selectable mixture of interior and exterior air will be supplied to passageways 23.

As best shown in FIG. 5, opening 18 located at the ridge or peak of roof structure 2 is closed by means of plate 30 extending between the innermost edges of panels 11 along the length of roof structure 2 in order to form an exhaust plenum or header 31 within ridge vent 19, thus connecting the outlet ends 32 of all of air passageways 23. As illustrated in FIG. 11 and FIG. 12, ridge vent 19, as well as roof panels 11 should be provided with appropriate insulation 33 over the supporting members or purlins 6 as required in order to prevent excessive loss of heat from the heated air moving within air passageways 23 and air plenum 31. In addition, thermal spacers 33a, preferably of a dense, non-metallic substance such as urethane, may be provided between insulation 33 and roof panels 11, as shown in FIG. 12.

A centrally located opening 34 is provided in plate 30 in order to form exhaust means for exhausting heated air from plenum 31. A blower 35 may also be provided in association with opening 34 and appropriate air ducts 36 to exhaust heated air from plenum 31, and thereby provide a continuous flow of air through air passageways 23. Air ducts 36 may connect with suitable air distribution means or other heat exchanger means (not shown) for providing space and water heating as required.

In installing glazing 22 of the type described in the embodiment of FIG. 3A-FIG. 5, a continuous sheet of the flexible glazing material may be assembled between the ridge and eaves of roof structure 2, and secured to some or all of upstanding ribs 17 by means of hat sections 24 as described hereinabove. The lowermost end of glazing 22 may be held in place as described hereinabove. The uppermost edge of glazing 22 may be secured beneath outwardly extending flange 19a of ridge cap 19 by a suitable adhesive or the like. In the event that the glazing is of insufficient width to completely cover the entire roof, individual strips of the flexible glazing material 22 may be utilized, with overlapping seams formed beneath hat sections 24. Alternatively, overlapping seams may be formed between upstanding ribs 17, or the glazing strips run parallel to the ridge and eaves of the roof structure, with overlapping seams permitting the free flow of rain water and the like downwardly over the glazing into gutter 20. It will be observed that in the event a tear or hole should occur in the glazing surface, it may be easily covered with a patch of the glazing material secured by an appropriate adhesive.

As described hereinabove, blower or fan 35 may operate continuously to provide circulation of air through air passageways 23, exhausting the heated air from air duct 36. Alternatively, blower 35 may be cycled as a function of collector temperature by means of a thermally responsive thermostat or the like 37 positioned near the outlet end of air passageway 23. Thermostat 37 operates to activate blower 35 as soon as the temperature at the outlet end of air passageway 23 rises sufficiently in temperature that heated air is available to supplement conventional heat sources within the building. Blower 35 also contains means in the form of a reversible motor or the like for reversing airflow through the air passageways to melt accumulated ice or snow on the glazing. Once the upper surface of the glazing is clear, blower 35 may be caused to operate in the normal direction to exhaust heated air from air duct 36 under control of thermostat 37.

An alternative glazing material is illustrated in the embodiment of FIG. 6, and comprises a plurality of relatively rigid sheets 38 of solar radiation transmissive material such as glass, fiberglass, Plexiglass, Lexan, etc. The outermost edges of glazing panels 38 are supported by the upper surfaces of the outwardly extending flange 24c of hat sections 24. As in the embodiment of FIG. 3A-FIG. 5, the height of downwardly depending leg sections 24b of hat sections 24 may be adjusted as desired to produce the required spacing between the glazing material and planar portion 12 of roof panels 11. Furthermore, the glazing may be attached to some or all of the roof ribs as required. A hat-shaped spring clip 39 overlies hat section 24, and is provided with downwardly depending legs 39a having outwardly turned lower ends 39b which contact the upper surface of glazing material 38 urging it downwardly against outwardly directed flange 24c of hat sections 24 in order to securely hold the glazing material in place, and provide a relatively air-tight seal between the glazing material and its support members. If desired, additional sealing means such as caulking, tape or the like may be provided between the edges of glazing 38 and the support members to insure an air-tight seal.

In the embodiment of FIG. 7, support for rigid glazing panels 38 is provided by elongated blocks 40 positioned between the glazing material and the planar portion 12 of roof panels 11. In this arrangement, the lower surface of the glazing material rests on the upper surface of the blocks 40, which may be constructed of a thermally non-conducting material such as wood, plastic, foam or the like. All components may be held in place by means of spring clips 39 similar to those described in connection with the embodiment of FIG. 6. Similar additional sealing means may also be utilized to insure an air-tight seal for air passageway 23.

In the embodiment of FIG. 8, rigid glazing panels 38 are provided at their outermost edges with downwardly depending legs 38a which serve to space the glazing material from planar portion 12 of roof panel 11 to form air passageway 23. In this embodiment, sealing means such as caulking or the like may be placed between the upper edge of legs 38a and ribs 17 to insure an air tight seal.

In the embodiment of FIG. 9, rigid glazing sheets 38 are supported by the upper surfaces of ribs 17, and are held in place by means of a threaded fastener 41 which passes through glazing material 38 into the upper surface of ribs 17. Apertures 41a, dimensioned to accept the threaded fasteners, may be provided in glazing 38 to prevent cracking or splitting of the glazing material. Additional mechanical strength and thermal insulation may be provided by a thin thermally non-conducting strip of rubber, plastic or the like 42 positioned between the head of fastener 41 and the upper surface of glazing material 38, as required.

In the preferred embodiments described hereinabove, a roof structure of the upstanding seam type having spaced parallel ribs extending between the ridge and eaves of the roof structure has been utilized. However, it will be understood that the inventive principles of the present invention may be applied to any type of corrugated, ribbed, grooved, fluted, or channeled roof structure as illustrated in FIG. 13-FIG. 16 where a flexible or rigid glazing material may span projections on the roof surface to form air passageways for directing air beneath the glazing material to a header or collection plenum where the air can be distributed to the building interior.

Figure 13:
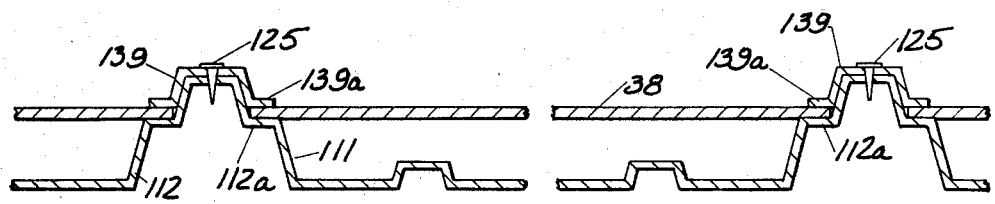
FIG. 13 is an enlarged fragmentary cross sectional view of the present invention using rigid glazing sheets in association with trapezoidal corrugated roof panels.

FIG. 13 is directed to an embodiment of the present invention utilizing rigid glazing 38 in association with corrugated roof panels 111 having trapezoidal-shaped upstanding rib sections 112. The outermost edges of glazing panel 38 rests upon horizontally extending ledges 112a formed in the upwardly sloping sides of ribs 112. A hat section 139, similar in construction to hat section 39 of FIG. 6, is secured to the uppermost end of rib 112 such that the outward extending flanges 139a rest against the upper surface of glazing 38 to urge the glazing sheet downwardly against ledge 112a. Hat section 139 may be held in place by threaded fastener 125 in a manner similar to that described hereinbefore with respect to the embodiment of FIG. 6.

Figure 14:
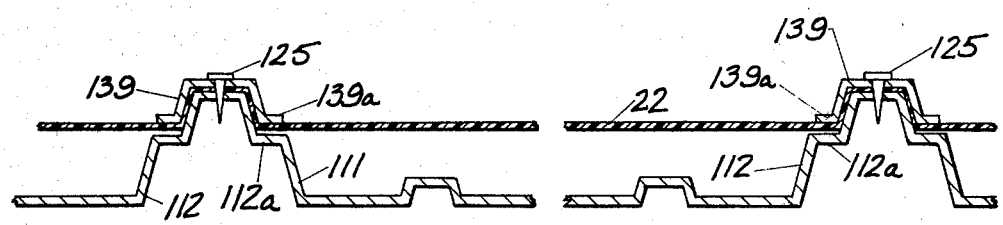
FIG. 14 is an enlarged fragmentary cross sectional view of the present invention using flexible film glazing in association with trapezoidal corrugated roof panels.

FIG. 14 illustrates an embodiment of the invention utilizing flexible film glazing 22 in association with corrugated roof panels 111 having trapezoidal upstanding ribs 112. Film glazing 22 is positioned between the upper surface of rib 112 and a hat section 139, with the outwardly extending flanges 139a of hat section 139 urging the film downwardly against ledges 112a to hold the film in place and eliminate ripples or wrinkles that might impair the transmission of solar radiation through the glazing material. A threaded fastener 125 may be used to secure hat section 139 to the upper portion of trapezoidal-shaped rib 112 in a manner similar to that described hereinbefore with respct to the embodiment of FIG. 3A.

Figure 15:
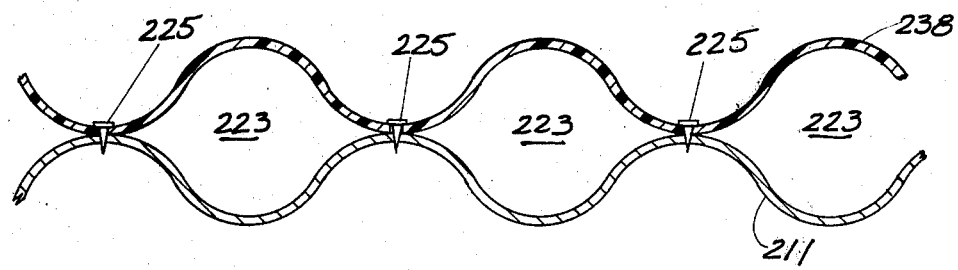
FIG. 15 is an enlarged fragmentary cross sectional view of the present invention using corrugated rigid glazing in association with corrugated roof panels.

FIG. 15 illustrates the present invention in association with a sinuous corrugated roof panel 211. In this embodiment, a sheet of corrugated solar radiation transmissive glazing material 238, having a shape similar to the shape of roof panel 211 overlies the roof panel such that the valleys or troughs of the glazing material are positioned adjacent the peaks of roof panel 211 in order to provide a plurality of parallel spaced air passageways 223 between the corrugated glazing and the corrugated roof panel. The glazing material may be held in place to the roof panel by means of a plurality of threaded fasteners or the like 225 securing these members together at some or all of their contiguous points.

Figure 16:
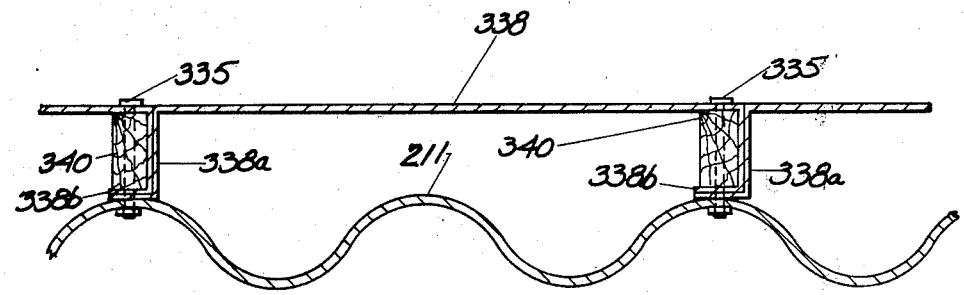
FIG. 16 is an enlarged fragmentary cross sectional view of the present invention using rigid glazing sheets in association with corrugated roof panels.

FIG. 16 illustrates an alternate embodiment for use with a corrugated roof panel section 211 utilizing a substantially rigid glazing sheet 338 terminating along its outermost edges in downwardly directed web members 338a. Each of web members 338a terminates at its lower end in an outwardly directed flange portion 338b. It will be observed that this construction permits flange and web portions of adjacent panels 338 to be nested or locked together to form a substantially continuous glazing surface. Blocklike spacers 340 constructed of a thermally insulating material such as wood, plastic or the like, may be provided as shown to space the glazing material 338 from roof surface 211 and provide additional rigidity to the glazing edges. A threaded fastener 335 may also be used as desired to secure the edges of glazing material 338 and insulating blocks 340 to some or all of the peaks of corrugated roof panel 211.

The present invention may also be applied to relatively smooth surfaced roof structures lacking any type of upwardly extending projections as illustrated in the embodiment of FIG. 10.

In general, smooth surfaced roof 43 may be constructed from any type of substance such as aluminum, steel, asphalt, slate, composition material, wood, etc., and may be provided with a darkened coating 26 as described hereinabove in connection with the previous embodiments, if necessary. A plurality of hat-shaped sections 44 having outwardly directed flanges 45 are attached to the roof at spaced locations by means of fasteners 46 or the like to provide support for rigid glazing sheets 38 which may also be secured to the top of hat sections 44 by fasteners 47 or the like. Alternatively, flexible glazing material 22 may be provided with the corresponding type of support structure as described hereinabove. In either event, the air passageways 23 so formed may be connected at the ridge by means of an air plenum or header as described hereinabove to complete the installation.

Figure 17:
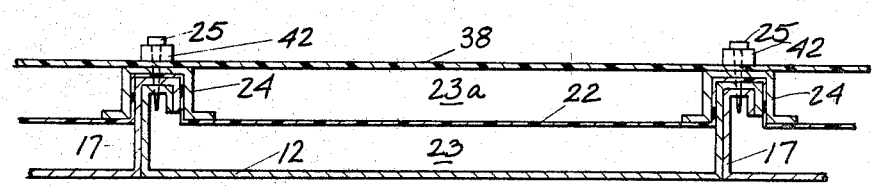
FIG. 17 is an enlarged fragmentary cross sectional view of the present invention using double glazing.

FIG. 17 illustrates an embodiment of the present invention utilizing double glazing to reduce heat loss, particularly in severe climatic locations. Although this embodiment of the invention is described and illustrated in connection with a roof panel 12 of the type having upstanding ribs 17 as in the embodiment of FIG. 3A, as described hereinbefore, a flexible film of glazing material 22 extends between ribs 17 and is held in place by hat sections 24 in order to provide a plurality of parallel air passageways 23. In the embodiment of FIG. 17, however, an additional layer of glazing material, either flexible film 22 or rigid glazing sheets 38, extends between the upper surfaces of hat sections 24, in order to form a plurality of dead air passageways 23a. It will be understood that either end of dead air passageways 23a may be blocked to prevent air movement therethrough, and consequently provide additional insulation for preventing heat loss from within air passageway 23. The additional film 22 or rigid glazing 38 sheet layer may be held in place by means of threaded fasteners 25 as described hereinabove. In addition, a thin slat-like strip 42 may be provided between the head portion of fastener 25 and the upper surface of the second layer of glazing material to provide additional support as required.

Figure 18:
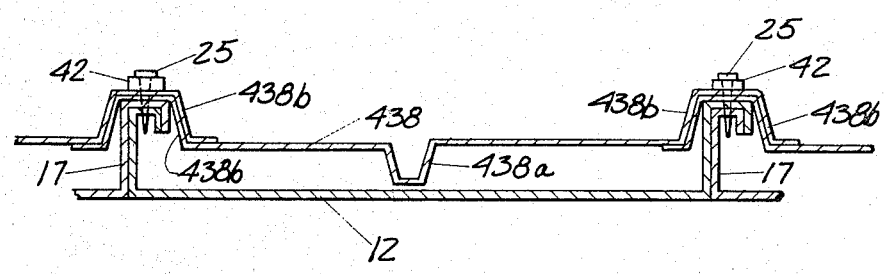
FIG. 18 is an enlarged fragmentary cross sectional view of the present invention using glazing having intermediate support means.

FIG. 18 represents an embodiment of the present invention wherein solar radiation transmissive glazing material 438 is provided with a channel-like central portion 438a, the lower edge of which rests against and is supported by the upper surface of roof panel 12. It will be observed that this construction provides additional rigidity for the glazing panel so that thinner material can be used for the glazing material 438. The outermost edges of the glazing sheet are trapezoidal-shaped as at 438b so that the edges may be nested and interlocked to provide a continuous glazing surface overlying the roofing panel. The assembled glazing sheets may be secured to upstanding ribs 17 by means of threaded fasteners 25 and intermediate slat-like strips 42 as described in connection with the embodiment of FIG. 17.

Figure 19:
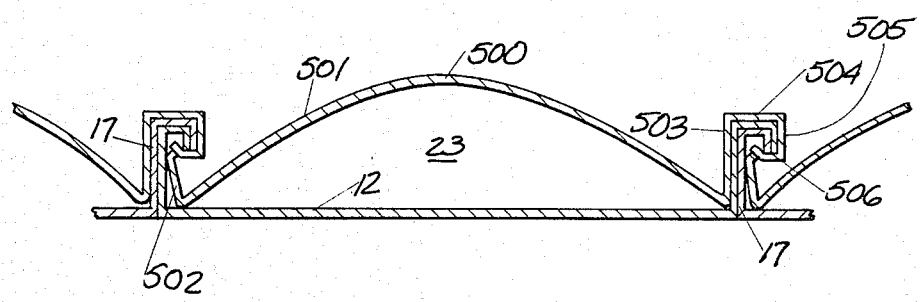
FIG. 19 is an enlarged fragmentary cross sectional view of the present invention utilizing bow-shaped glazing means.

FIG. 19 illustrates an embodiment of the present invention which eliminates the need for additional fasteners or supporting means to secure the glazing sheets to the upstanding ribs 17 of roof panels 12. In particular, each sheet of flexible glazing material 500 includes a central bow-shaped portion 501 which extends between ribs 17. As described hereinabove, each rib 17 includes a web portion extending upwardly from the roof surface, a horizontal flange portion extending outwardly from the upper end of the web portion, and a channel section formed by a lip portion extending downwardly from the outer edge of the flange portion. One outer edge 502 of sheet 500 terminates in an upwardly directed flange which is dimensioned to be seated within the channel section of rib 17. The opposite edge of sheet 500 terminates in an upwardly directed web 503, the upper edge of which extends outwardly in a horizontal flange portion 504. The outermost edge of portion 504 continues downwardly in lip section 505, inwardly in flange portion 506 and finally upwardly within the channel section formed by the opposite rib 17. This arrangement permits sheet 500 to be snapped into place and held by outward pressure against ribs 17 against displacement. It will be understood that the central portion of sheets 500 may be flat, assuming a bowed shape when inserted between ribs 17. Alternatively, the central portion 501 of sheet 500 may be provided with a bow-shape to eliminate possible residual stresses. In all of the embodiments described, the glazing may be attached to some or all of the cooperating roof support structures, as required.

The arrangements of FIG. 20 and FIG. 21 illustrate additional insulation features to prevent heat loss from the glazing support supporting members. For example, in FIG. 20, channel-shaped insulation members 22a, preferably of the non-rigid type, are used with the construction of FIG. 3A, for example, to limit the heat transfer between glazing 22 and hat section 24. Alternatively, as shown in FIG. 21, ribs 17 may be topped with a strip of insulating material 22b underlying glazing means 22 not only where the rib is used as an attachment point for the glazing but also where the rib is used as an intermediate support member.

As described hereinabove, the present invention permits the use of the entire roof surface of existing or new structures, particularly those of the pre-engineered variety having roof structures including upwardly standing ribs or seams, to produce supplemental solar heating for use in the building interior at significantly less cost than conventional solar heating installations. It will be understood that various changes in the details, materials, steps and arrangements of parts, which have been herein described and illustrated in order to explain the nature of the invention, may be made by those skilled in the art within the principle and scope of the invention as set forth in the appended claims. For example, the solar roof of the present invention has been described and illustrated in combination with a gabled roof of the type having oppositely sloped roof surfaces meeting at their peak along a ridge line. However, it will be understood that the inventive principles may be applied to only a portion of the roof surface lying on a particular roof slope, or only to one of the roof slopes. Furthermore, the present invention may be used with other types of roof shapes such as flat, single slope, butterfly, mansard, etc.

The embodiments of the invention in which an exclusive property or privilege is claimed are as follows:

1. In a building structure of the type having a roof construction including a plurality of spaced rafters supporting a plurality of spaced generally parallel transversely extending purlins and a plurality of interlocking rigid metallic roof panels positioned on and extending between said purlins, each of said panels having a central planar portion and a web extending upwardly along opposite edges of the planar portion, each of the webs being configured to interlock with a web of an adjoining panel to form a channel-like rib, said ribs extending in generally parallel fashion between the ridge and eave of the roof, the improvement in combination therewith comprising means for converting said roof construction to a solar collector for converting solar energy impinging thereon to thermal energy including:

glazing means defined by a solar radiation transmissive sheet overlying the outer surface of the roof construction in spaced relationship therewith and being supported by said ribs at spaced points to form a plurality of duct-like air passageways between the lower surface of the solar radiation transmissive sheet and the central planar portion of the roof panels, the sides of said air passageways being formed by the inside surfaces of the channel-like ribs adjoining said central planar portion, said air passageways extending generally between the eave and ridge of the roof structure;

means associated with the upper surface of said central planar portion for converting solar radiation impinging thereon to thermal energy within the air passageway;

means for attaching said solar radiation transmissive sheet to said ribs to maintain the sheet in spaced relationship with said central planar portion comprising an elongated hat section including a planar portion and leg portions depending downwardly from the outer edges of said planar portion, said sheet being secured between said hat section and said rib, the lower ends of said leg portions operating to space the sheet from the roof surface;

inlet means for introducing air into one end of the air passageway; and outlet means for exhausting heated air from the opposite end of the air passageway for use in the building structure interior such that air moves in a single direction between inlet and outlet within said passageway in contact with the upper surface of the panel and the lower surface of the solar radiation transmissive sheet, whereby a solar collector may be formed by using the roof surface as the solar radiation absorbing surface.

2. The solar roof according to claim 1 wherein said metallic panel is coated with a material for increasing the absorptivity of said panel.

3. The solar roof according to claim 1 wherein said roof construction extends upwardly at a relatively low slope between an eave at its lowermost edge to a ridge at its uppermost edge, said ribs and said air passageway extending between said eave and said ridge.

4. The solar roof according to claim 3 wherein said inlet means is located adjacent said eave and said outlet means comprises a duct-like plenum extending along said ridge and communicating with said air passageway, said plenum including duct means for exhausting said heated air into said building interior.

5. The solar roof according to claim 4 including air moving means associated with said plenum.

6. The solar roof according to claim 3 including a plurality of upwardly sloping roof surfaces, each having upper edges meeting at said ridge.

7. The solar roof according to claim 3 wherein said roof extends upwardly at a pitch of no more than 1:12.

8. The solar roof according to claim 1 wherein said glazing means comprises a pair of spaced parallel solar transmissive sheets.

9. The solar roof according to claim 1 wherein said glazing means comprises a thin flexible sheet.

10. The solar roof according to claim 9 wherein said glazing means includes a solar radiation transmissive sheet positioned in overlying spaced parallel relationship with said flexible sheet to create a dead air space between said sheets.

11. The solar roof according to claim 1 wherein said glazing means comprises a substantially rigid sheet.

12. The solar roof according to claim 11 wherein said hat section includes flange portions extending outwardly from the lower edge of said leg portion, the edges of said sheet resting upon and extending between said flange portions.

13. The solar roof according to claim 12 wherein said hat section comprises an elongated hat shaped spring clip attached to said rib and having downwardly directed spring-like legs pressing against the upper surface of said sheet.

14. The solar roof according to claim 11 including a leg portion directed downwardly from the central portion of said sheet for supporting said sheet from said roof surface.

15. The solar roof according to claim 1 wherein said attaching means comprises leg portions projecting downwardly from the outer edges of said sheet, the lower edges of said legs resting on said roof surface, and means attached to said rib for urging said leg portions against said roof surface.

16. The solar roof according to claim 1 wherein said glazing means comprises a flexible solar radiation transmissive sheet positioned in spaced non-parallel relationship with said roof surface.

17. The solar roof according to claim 16 wherein said sheet is bow-shaped.

18. The solar roof according to claim 1 wherein said glazing means comprises a flexible solar radiation transmissive sheet positioned in spaced parallel relationship with said roof surface.

19. The solar roof according to claim 1 including valve means associated with said inlet means, said valve means having a first position wherein only air from inside said building is introduced into said passageway, a second position wherein only air from outside said building is introduced into said passageway, and at least one other position wherein air from both inside and outside said building is introduced into said passageway.

20. The solar roof according to claim 1 including a plurality of said passageways, and wherein said inlet means includes a duct-like inlet plenum connecting said passageways and communicating with a source of air to be heated.

21. The solar roof according to claim 1 including means for thermally insulating said glazing means from said rib.

22. The solar roof according to claim 21 wherein said insulating means comprises a thermally insulating member positioned between said sheet and said rib.

23. The solar roof according to claim 1 including means for moving air through said air passageway from said inlet means to said outlet means and temperature sensing means positioned within said air passageway adjacent said outlet means for operating said air moving means when the temperature of the air within said air passageway adjacent said inlet means exceeds a predetermined temperature.

24. The building according to claim 1 including means for moving air between said inlet and outlet means through said air passageway.

25. The building according to claim 24 including thermostat means positioned within said air passageway adjacent said outlet means for operating said air moving means when the air temperature proximate said thermostat means exceeds a predetermined value.

26. The building according to claim 1 including a roof surface having a relatively low pitch, said inlet means being positioned adjacent the lower edge of said roof surface, said outlet means being positioned adjacent the upper edge of said roof surface.

27. A method for constructing a solar roof to supply supplemental heated air to an existing building structure by retrofitting an existing conventional roof construction associated with the building of the type having a plurality of spaced rafters supporting a plurality of spaced generally parallel transversely extending metallic purlins and a plurality of interlocking rigid metallic roof panels positioned on and extending between said purlins, each of said panels having a central planar portion and a web extending upwardly along opposite edges of said planar portion, each of the webs being configured to interlock with a web of an adjoining panel to form a channel-like rib, said ribs extending in generally parallel fashion between the ridge and eave of the roof, said method comprising the steps of:

attaching to said ribs by means of a hat section including a planar portion and leg portions depending downwardly from the outer edges of the planar portion a solar radiation transmissive sheet such that the sheet is secured between the hat portion and the rib with the lower ends of the leg portions positioning the sheet in spaced overlying relationship with the outer surface of the roof construction to form a plurality of duct-like air passageways positioned between the lower surface of the solar radiation transmissive sheet and the central planar portion of the roof panels with the inside surfaces of the channel-like ribs adjoining the central planar portion of the roof panel forming the sides of the air passageway, said air passageways extending generally between the eave and ridge of the roof structure, the central planar portion of the panel serving as a solar radiation absorbing surface; and supplying means for introducing air into one end of the air passageways and for removing heated air from the opposite end of the air passageways for use within the building structure interior such that air moves in a single direction between inlet and outlet within said passageway in contact with the upper surface of the panel and the lower surface of the solar radiation transmissive sheet.

28. The method according to claim 27 including the step of coating said roof surface with a material to increase the absorptivity of the roof surface.

29. The method according to claim 27 wherein said roof is of the type having an upwardly sloping surface, including the step of introducing unheated air into said air passageway adjacent the lower edge of said roof surface, and removing heated air from said air passageway adjacent the upper edge of said roof surface.

30. The method according to claim 27 including the step of providing a hollow duct-like air plenum adjacent the upper edge of said roof surface for receiving heated air removed from said air passageway and distributing said heated air to the interior of said building structure.

31. The method according to claim 27 including the step of providing means for moving air from said air introducing means to said air removing means.

32. The method according to claim 31 including the step of operating said air moving means.

33. The method according to claim 32 wherein said air moving means is operated only when the air temperature within said air passageway adjacent said outlet means exceeds a predetermined value.

34. The method of claim 27 including the step of selectably introducing air from inside or outside of said building or both.

35. The solar roof according to claim 1 wherein said hat section includes flange portions extending outwardly from the lower edge of said leg portions, said flanges operating to assist in spacing said sheet from said roof surface.

* * * * *